(12) United States Patent
Ito

(10) Patent No.: US 7,769,150 B2
(45) Date of Patent: Aug. 3, 2010

(54) FACSIMILE DEVICE

(75) Inventor: Tomohiro Ito, Mizuho (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1164 days.

(21) Appl. No.: 11/389,071

(22) Filed: Mar. 27, 2006

(65) Prior Publication Data

US 2006/0233329 A1 Oct. 19, 2006

(30) Foreign Application Priority Data

Mar. 25, 2005 (JP) ............................. 2005-088260

(51) Int. Cl.
*H04M 11/00* (2006.01)
*H04N 1/32* (2006.01)
(52) U.S. Cl. ...................... 379/100.01; 379/399.01; 379/90.01; 379/93.09
(58) Field of Classification Search ............ 379/100.01, 379/100.02, 100.03, 100.05, 100.06, 100.07, 379/100.09, 100.12, 100.15, 93.08, 93.09, 379/93.11; 358/440–468
See application file for complete search history.

(56) References Cited

U.S. PATENT DOCUMENTS

| | | | | |
|---|---|---|---|---|
| 5,809,132 | A * | 9/1998 | Sakamoto | 379/377 |
| 2005/0031098 | A1 | 2/2005 | Ito | |
| 2006/0215229 | A1 * | 9/2006 | Ito | 358/442 |

FOREIGN PATENT DOCUMENTS

| | | |
|---|---|---|
| JP | H05-191505 A | 7/1993 |
| JP | 2000-0286993 A | 10/2000 |
| JP | 2004 207809 | 7/2004 |
| JP | 2004-0207809 A | 7/2004 |
| JP | 2005-057659 A | 3/2005 |

OTHER PUBLICATIONS

Japan Patent Office, Notification of Reasons of Rejection( issued in corresponding Japanese Patent Application No. 2005-088260), dated Sep. 25, 2007.

* cited by examiner

*Primary Examiner*—Melur Ramakrishnaiah
(74) *Attorney, Agent, or Firm*—Baker Botts L.L.P.

(57) ABSTRACT

A device includes a facsimile circuit, a voltage detector, an open-circuit voltage detector, and a telephone status monitoring unit. If a first voltage difference is less than a predetermined voltage difference, the monitoring unit judges that the public line is released if a second voltage difference is less than the predetermined difference, and that the public line is closed if the second difference is not less than the predetermined difference. If, when the facsimile circuit has released the public line, the first difference is not less than the predetermined difference, the monitoring unit judges that the public line is released if the second difference is less than the predetermined difference or if the detected line voltage equals the open-circuit voltage, and that the public line is closed if the second difference is not less than the predetermined difference and if the detected line voltage is different from the open-circuit voltage.

5 Claims, 8 Drawing Sheets

FACSIMILE DEVICE

CROSS-REFERENCE TO RELATED APPLICATION

This application claims priority under 35 U.S.C. §119 from Japanese Patent Application No. 2005-088260, filed on Mar. 25, 2005. The entire subject matter of the application is incorporated herein by reference.

BACKGROUND

1. Technical Field

Aspects of the present invention relate to a facsimile device used in a situation in which the facsimile device is connected to a public line in parallel with a telephone, particularly to a facsimile device having a printing function and a scanning function.

2. Description of Related Art

A facsimile device is configured to communicate with an external device through the public line. Therefore, in general, a facsimile device is used in an office or a home in a situation where the facsimile device is connected to the public line in parallel with a telephone. From the viewpoint of such a use environment of facsimile devices, a facsimile device having the function of judging whether a telephone (i.e., whether the telephone is in an on-hook state) closes the public line has been proposed.

An example of such a facsimile device is disclosed in Japanese Patent Provisional Publication No. 2004-207809 (hereafter, referred to as JP 2004-207809A). According to JP 2004-207809A, the facsimile device is configured to detect a voltage of the public line to which the facsimile device and a telephone (an external telephone) are connected. The facsimile device judges that the external telephone closes the public line (i.e., the external telephone is in an on-hook state) if the facsimile device releases the public line and the voltage of the public line is lower than or equal to a predetermined voltage, while the facsimile device judges that the external telephone releases the public line (i.e., the external telephone is in an off-hook state) if the facsimile device releases the public line and the voltage of the public line is higher than the predetermined voltage.

Meanwhile, there is a case where the facsimile device is not able to appropriately judge whether the external telephone releases the public line if a digital service unit such as a PBX (Private Branch Exchange) or a terminal adapter intervenes between the public line and communication devices (i.e., the facsimile device and the external telephone). FIG. 8 is a graph illustrating change of the voltage of the public line in a situation where a digital service unit does not intervene between the public line and the communication devices. As shown in FIG. 8, if the facsimile device or the external telephone transfer to a state where the facsimile device and the external telephone are capable of conducting data communications, the public line is closed and the voltage of the public line decreases from a standby voltage Vr to a certain low voltage. If the public line is released, the voltage of the public line recovers to the standby voltage Vr.

In this situation, the facsimile device is able to appropriately judge that the external telephone closes the public line (i.e., the external telephone is in an on-hook state) if the voltage of the public line is lower than a predetermined threshold Vt, while the facsimile device is appropriately judge that the external telephone releases the public line (i.e., the external telephone is in an off-hook state) if the voltage of the public line is higher than the predetermined threshold Vt.

On the other hand, if a digital service unit intervenes between the public line and the communication devices, the voltage of the public line may change as shown in FIG. 9. That is, FIG. 9 is a graph illustrating the case where the voltage of the public line does not recover quickly to the standby voltage Vr after the facsimile device releases the public line. In this case, the voltage of the public line does not recover to the standby voltage Vr until a predetermined time period has elapsed. That is, the voltage of the public line stays at an intermediate voltage, which is lower than the predetermined threshold Vt, until the predetermined time period has elapsed.

In this case, the facsimile device erroneously judges that the external telephone closes the public line even if the external telephone has released the public line because as described above the voltage of the public line is kept at the intermediate voltage lower than the predetermined threshold Vr in the predetermined time period. In this case, the facsimile device may erroneously display a message indicating that the external telephone is in a busy state despite the fact that the external telephone has already releases the public line.

SUMMARY

Aspects of the present invention are advantageous in that a facsimile device, capable of preventing an erroneous judgment that an external telephone closes a public line from occurring when the facsimile device releases the public line, is provided.

BRIEF DESCRIPTION OF THE ACCOMPANYING DRAWINGS

DETAILED DESCRIPTION

General Overview

Figure 1:
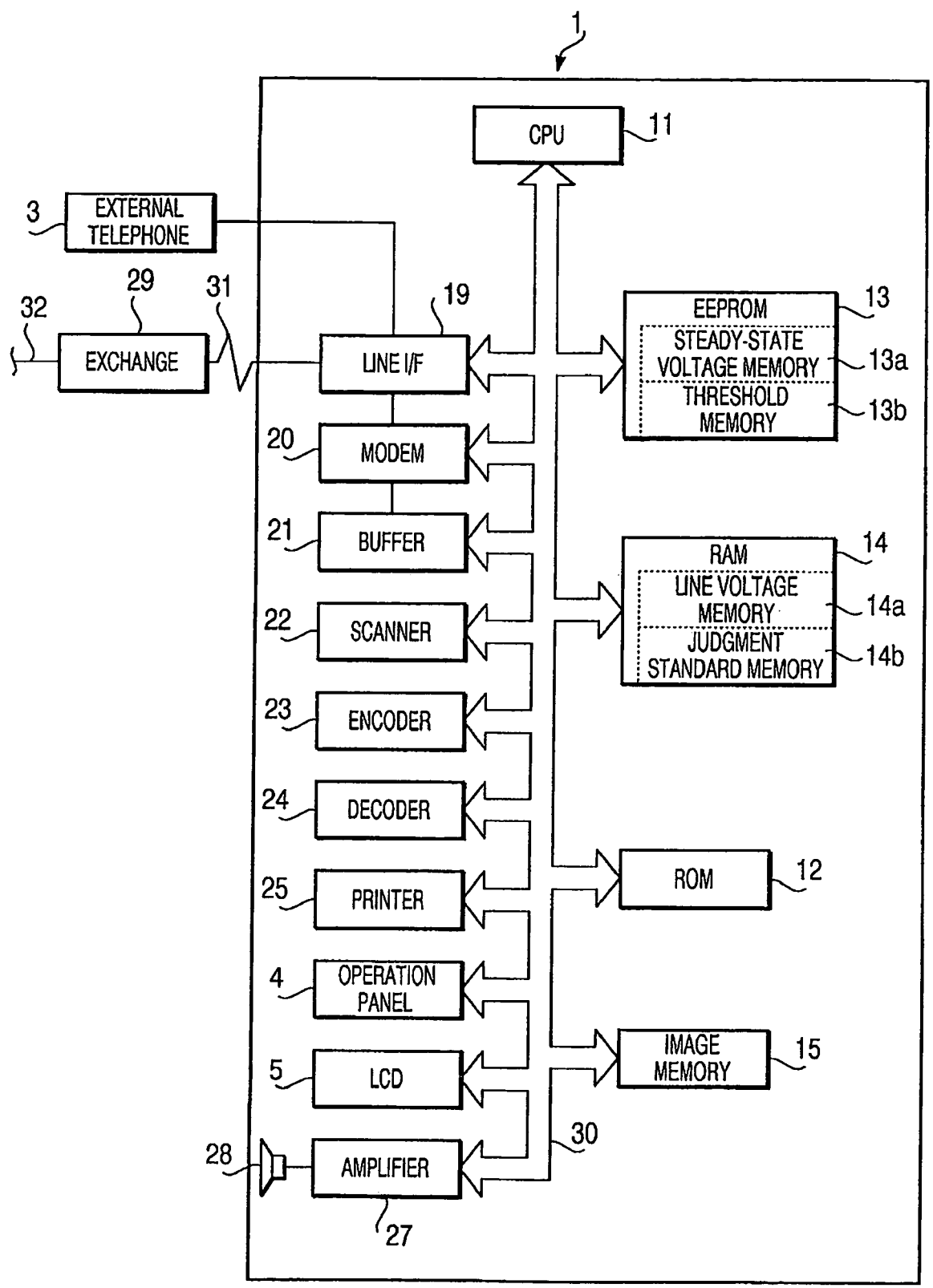
FIG. 1 is a block diagram of a facsimile device in accordance with embodiments of the invention.

According to an aspect of the invention, there is provided a facsimile device connected to a public line in parallel with an external telephone. The facsimile device is provided with a facsimile circuit configured to send and receive image data through the public line, a voltage detector that detects a voltage of the public line, an open-circuit voltage detector that releases the public line after closing the public line and detects an open-circuit voltage, a telephone status monitoring unit configured to judge whether the external telephone closes the public line or releases the public line based on the voltage of the public line detected by the voltage detector, and a warning unit configured to output a warning indicating that the external telephone is in a busy state if the telephone status monitoring unit judges that the external telephone closes the public line.

In this configuration, if a voltage difference between a reference voltage and the open-circuit voltage detected by the open-circuit voltage detector is smaller than a predetermined voltage difference, the telephone status monitoring unit operates to judge that the external telephone releases the public line if a voltage difference between the reference voltage and a detected line voltage detected by the voltage detector when the facsimile circuit has released the public line is smaller than the predetermined voltage difference, and to judge that the external telephone closes the public line if the voltage difference between the reference voltage and the detected line voltage detected by the voltage detector when the facsimile circuit has released the public line is larger than or equal to the predetermined voltage difference. If the voltage difference between the reference voltage and the open-circuit voltage detected by the open-circuit voltage detector is larger than or equal to the predetermined voltage difference, the telephone status monitoring unit operates to judge that the external telephone releases the public line if the voltage difference between the reference voltage and the detected line voltage detected by the voltage detector when the facsimile circuit has released the public line is smaller than the predetermined voltage difference or if the detected line voltage detected by the voltage detector when the facsimile circuit has released the public line is equal to the open-circuit voltage, and to judge that the external telephone closes the public line if the voltage difference between the reference voltage and the detected line voltage detected by the voltage detector when the facsimile circuit has released the public line is larger than or equal to the predetermined voltage difference and if the detected line voltage detected by the voltage detector when the facsimile circuit has released the public line is different from the open-circuit voltage.

With this configuration, it is possible to prevent the facsimile device from erroneously judging that the external telephone closes the public line even if the external telephone has released the public line. It should be noted that such an advantage is attained in the case where the voltage of the public line at a time when the facsimile circuit has released the public line is kept at an intermediate voltage.

According to another aspect of the invention, there is provided a facsimile device connected to a public line in parallel with an external telephone. The facsimile device is provided with a facsimile circuit configured to send and receive image data through the public line, a voltage detector that detects a voltage of the public line, an open-circuit voltage detector that releases the public line after closing the public line and detects an open-circuit voltage, a telephone status monitoring unit configured to judge whether the external telephone closes the public line or releases the public line based on the voltage of the public line detected by the voltage detector, and a warning unit configured to output a warning indicating that the external telephone is in a busy state if the telephone status monitoring unit judges that the external telephone closes the public line.

In this configuration, if a voltage difference between a reference voltage and the open-circuit voltage detected by the open-circuit voltage detector is smaller than or equal to a predetermined voltage difference at a time when the facsimile circuit has released the public line, the telephone status monitoring unit operates to judge that the external telephone releases the public line if a voltage difference between the reference voltage and a detected line voltage detected by the voltage detector when the facsimile circuit has released the public line is smaller than the predetermined voltage difference, and to judge that the external telephone closes the public line if the voltage difference between the reference voltage and the detected line voltage detected by the voltage detector when the facsimile circuit has released the public line is larger than or equal to the predetermined voltage difference. If the voltage difference between the reference voltage and the open-circuit voltage detected by the open-circuit voltage detector is larger than the predetermined voltage difference, the telephone status monitoring unit operates to judge that the external telephone releases the public line if the voltage difference between the reference voltage and the detected line voltage detected by the voltage detector when the facsimile circuit has released the public line is smaller than the predetermined voltage difference, to judge that the external telephone closes the public line if the voltage difference between the reference voltage and the detected line voltage detected by the voltage detector when the facsimile circuit has released the public line is larger than or equal to the predetermined voltage difference and if the detected line voltage detected by the voltage detector when the facsimile circuit has released the public line is different from the open-circuit voltage, to judge that the external telephone releases the public line if the detected line voltage detected by the voltage detector when the facsimile circuit has released the public line is equal to the open-circuit voltage and if a voltage difference between the reference voltage and a voltage of the public line detected by the voltage detector after a predetermined time elapses from a time when the facsimile circuit has released the public line is smaller than the predetermined voltage difference, and to judge that the external telephone closes the public line if the detected line voltage detected by the voltage detector when the facsimile circuit has released the public line is equal to the open-circuit voltage and if a voltage difference between the reference voltage and a voltage of the public line detected by the voltage detector after a predetermined time elapses from a time when the facsimile circuit has released the public line is larger than or equal to the predetermined voltage difference.

With this configuration, it is possible to prevent the facsimile device from erroneously judging that the external telephone closes the public line even if the external telephone has released the public line. It should be noted that such an advantage is attained in the case where the voltage of the public line at a time when the facsimile circuit has released the public line is kept at an intermediate voltage.

Optionally, the predetermined time is longer than or equal to a time required for a voltage difference between the reference voltage and a voltage of the public line to change to a value smaller than the predetermined voltage difference with respect to a time when the facsimile circuit releases the public line.

Such a configuration enables the facsimile device to securely judge whether the external telephone closes the public line or releases the public line.

In the above mentioned two aspects of the invention, the facsimile device may further include an line type judgment unit configured to judge a type of the public line, and a detector activation unit configured to activate the open-circuit voltage detector only if the line type judgment unit judges the type of the public line.

With this configuration, it is possible to activate the open-circuit voltage detector only when the external telephone has released the public line because the line type judgment unit checks the type of the public line only when the external telephone doe not closes the public line. Therefore, is becomes possible to accurately detect the open-circuit voltage of the public line.

ILLUSTRATIVE EMBODIMENTS

Hereafter, illustrative embodiments according to the invention will be described with reference to the accompanying drawings.

First Embodiment

Figure 2:
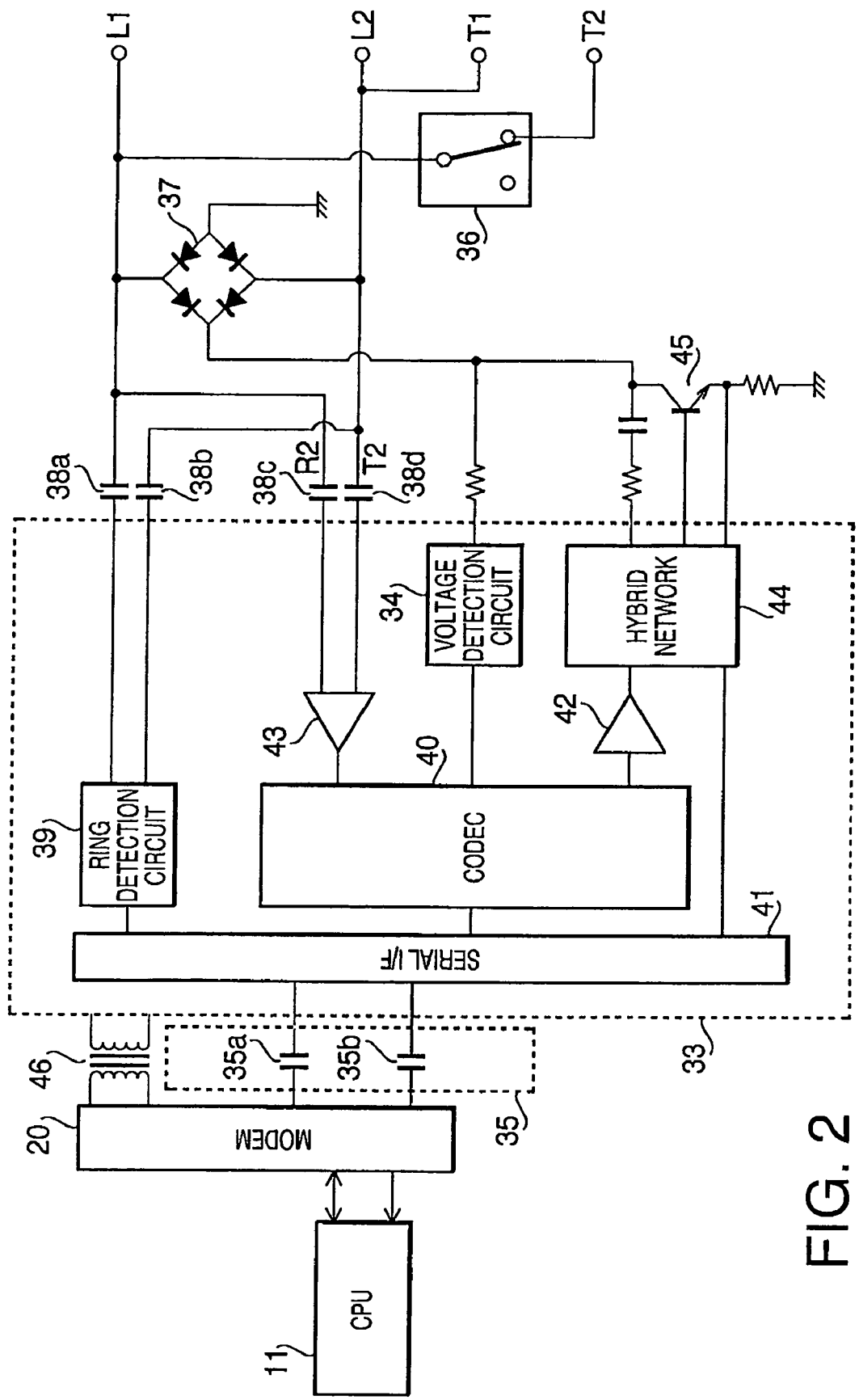
FIG. 2 is a circuit diagram of a line interface unit 1 of the facsimile device in accordance with embodiments of the invention.

FIG. 1 is a block diagram of a facsimile device 1 according to a first embodiment of the invention. FIG. 2 is a circuit diagram of a line I/F (interface) unit 19 of the facsimile device 1. As shown in FIG. 1, the facsimile device 1 includes a CPU 11, a ROM 12, an EEPROM 13, a RAM 14, an image memory 15, the line I/F 19, a modem 20, a buffer 21, a scanner 22, an encoding unit 23 and a decoding unit 24 (which form a facsimile circuit). The facsimile device 1 further includes a printer 25 (the printing function), an operation panel 4, an LCD (liquid crystal display) 5, and an amplifier 27. These components are connected to each other via a bus 30.

As shown in FIG. 1, an external telephone 3 and the facsimile device 1 are connected to the public line (i.e., public network) 32 in parallel via an exchange 29. That is, the exchange 29 intervenes between the public line 32 and communication devices (i.e. the facsimile device 1 and the external telephone 3).

On the LCD 5, various types of information are displayed according to instructions from the CPU 11. For example, a message indicating that the external telephone 3 is in a busy state, or a message indicating that the facsimile device 1 is in a data transmission mode is displayed on the LCD 5.

The line I/F 19 serves to control the line. The line I/F 19 may be attained by a DAA (Direct Access Arrangement) IC (integrated circuit) 33. As shown in FIG. 2, the line I/F 19 serves to receive various types of signals, including a call signal (a ring signal) and a signal conveying a phone number of the party on the other end (a caller number), from the exchange 29. The line I/F 19 further serves to send a dial signal in accordance with a user operation through the operation panel 4, to the exchange 29.

The line I/F 19 is provided with external terminals T1 and T2 which are used to connect the external telephone 3 to the public line 32 in parallel with the facsimile device 1.

The CPU 11 controls the internal components via the bus 30 in accordance with signals received via the line I/F 19 so that the facsimile function (i.e., data communication function of sending or receiving image signals) can be attained. In the ROM 12, various types of programs (including a programs shown in FIGS. 3 to 5) to be executed by the CPU 11 are stored. In the RAM 14, various types of data are stored temporarily during the execution of a program. The RAM 14 includes a line voltage memory 14a and a judgment standard memory 14b.

The line voltage memory 14a stores a voltage value to be supplied to the DAA IC 33 when a DC-circuit for controlling the public line is released in the DAA IC 33. In the line voltage memory 14a, voltage values detected by a voltage detection circuit 34 when the public line 31 is released are stored successively in the order in which the voltages are detected.

The line voltage memory 14a is capable of storing more than one voltage values (e.g., ten voltage values). If more than one voltage values are stored in the line voltage memory 14a, an average of the voltage values is calculated and then the voltage values are removed form the line voltage memory 14a. The average is stored in a steady-state voltage memory 13a as a standby voltage Vr in a steady-state.

Figure 5:
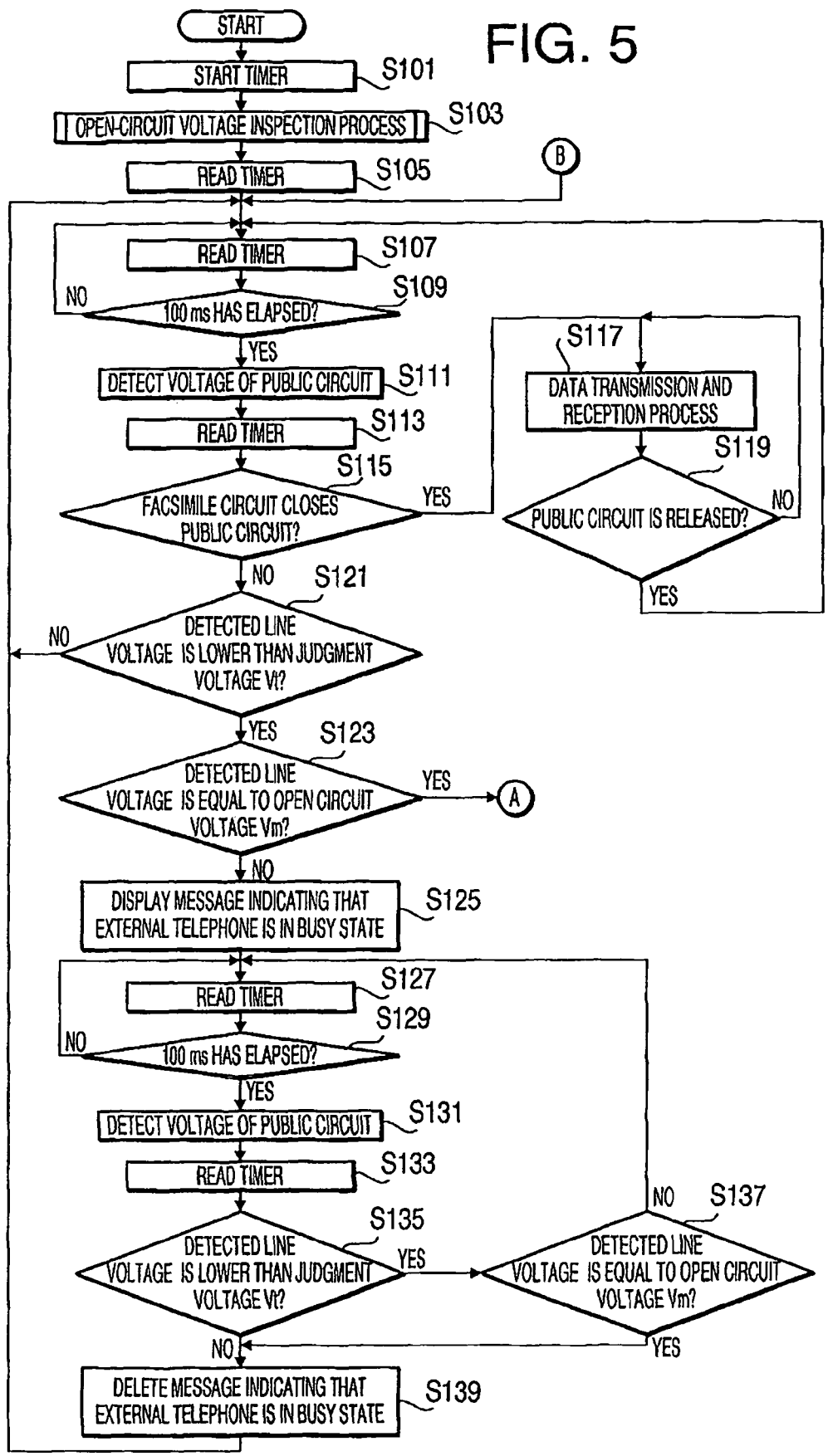
FIGS. 5 and 6 show a flowchart of a control process for detecting a state of an external telephone executed by the facsimile device in accordance with a second embodiment of the invention.
Figure 6:
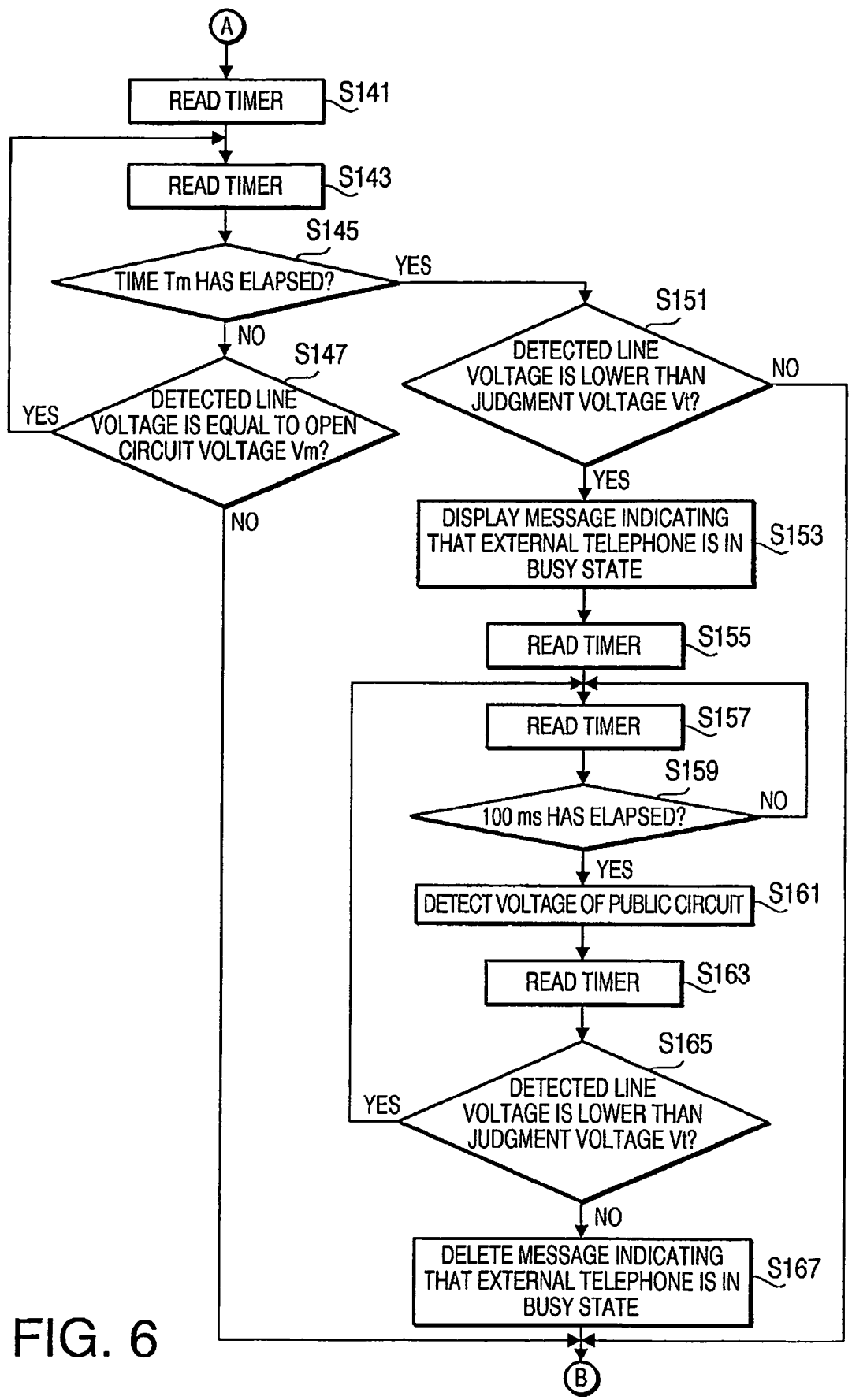

The judgment standard memory 14b stores a judgment voltage Vt used as a criterion for judging whether the external telephone 3 is in an off-hook (hook up) state or in an on-hook (hook down) state. As shown in FIGS. 5 and 6, the judgment voltage Vt is lower than a reference voltage corresponding to a state in which the public line 31 is released, and a difference between the judgment voltage Vt and the reference voltage is larger than or equal to a certain voltage difference $\Delta V$. In this embodiment, the standby voltage Vr is used as the reference voltage.

The EEPROM 13 includes the steady state voltage memory 13a and a threshold value memory 13b. The EEPROM 13 is able to hold data after the facsimile device 1 is turned to OFF.

In the steady-state memory 13a, the standby voltage Vr is stored. Data of the steady-state memory 13a is updated by an average of ten voltage values when ten voltage values are stored in the line voltage memory 14a. That is, the steady-state memory 13a is updated periodically while the public line 31 is in a released state.

In the threshold value memory 13b, a factor Ct (e.g., 0.5) and an open-circuit voltage Vm, which are used to calculate the judgment voltage Vt for judging whether the external telephone 3 is in the off-hook state, are stored. In this embodiment, the judgment voltage Vt is calculated by multiplying the standby voltage Vr stored in the steady-state voltage memory 13a by the factor Ct stored in the threshold value memory 13b, and then the judgment voltage Vt is stored in the judgment standard memory 14b. The facsimile device 1 may be configured such that a user is able to modify the value of the factor Ct through the operation panel 4.

The image memory 15 is used to store a bit image of a communication history, image data or print data. The image memory 15 is, for example, a DRAM. Image data received by the facsimile device 1 is stored in the image memory 15 first, and an image represented by the image data is printed on a sheet by the printer 25. Subsequently, the image data is removed from the image memory 15. Image data corresponding to an image read by the scanner 22 is also stored in the image memory 15.

The modem 20 has the function of communicating with another device in accordance with a certain communication protocol while modulating and demodulating communication data, such as image data. The buffer 21 temporarily stores the communication data, such as encoded data, being exchanged between the facsimile device and another device.

The scanner 22 reads images from an original inserted into an original insertion opening (not shown) of the scanner 22. The scanner 22 is provided with a carrying motor for carrying an original (not shown). The encoding unit 23 encodes image data of an image read by the scanner 22. The decoding unit 24 reads image data from the buffer 21 or the image memory 15, and decodes the image data. An image represented by the decoded data is printed on a sheet by the printer 25. The amplifier 27 amplifies a sound signal to output sound (e.g., ringing tone or voice) through the speaker 28.

The printer 25 may be an inkjet printer including a sheet carrying motor, and a carriage motor for driving a carriage on which a print head is mounted.

The facsimile device 1 configured as above is connected to the public line 31 via the line I/F 19. The public line 31 connects the facsimile device 1 to the exchange 29, and the exchange 29 is connected to the public line 32.

As shown in FIG. 2, the DAA IC 33 has the functions as a circuit termination, a hybrid network, and a ring signal detector. An isolator 35 intervenes between the DAA IC 33 and the modem 20. The isolator 35 provides electrical isolation between the modem 20 and the DAA IC 33 in regard to a DC current, while the isolator 35 allows data and signals to pass through. The line I/F 19 further includes a CML (Connect MODEM to Line) relay 36 used to switch between voice communication and image communication, a rectifier 37, and DC loop cut capacitors 38a, 38b, 38c and 39d. The terminals L1 and L2 are connected to the public line 31. To the terminals T1 and T2, the external telephone 3 can be connected.

A codec 40 provided in the DAA IC 33 has the functions as an AC-DC converter and a DC-AC converter for facsimile data. In this configuration, the isolator 35 allows digital signals to pass through, and capacitors 35a and 35b provide high insulation performance.

In a standby mode, the CML relay 36 is set for a state where a line is closed for the external telephone 3 as shown in FIG. 2. In a facsimile communication mode, the CPU 11 operates to release the public line 32 from the external telephone 3 by changing a CML relay control signal to an OFF state.

The rectifier 37 rectifies a DC loop current of the public line to change the DC loop current to a current flowing only in a predetermined direction. Power supply voltage for the DAA IC 33 is supplied from the modem 20 side via a transformer 46, and the power supply voltage is rectified by the rectifier 37 so that the power supply voltage stays in a constant polarity regardless of voltage polarities of the public line 31. The voltage detection circuit 34 detects the voltage which has been rectified by the rectifier 37 and has been supplied to the DAA IC 33. As shown in FIG. 2, the voltage detection circuit 34 is connected to the codec 40 and a connection line connecting the rectifier 37 with the hybrid network 44. The detection result of the voltage detection circuit 34 is sent to the CPU 11 via the DAA IC 33 and the modem 20.

The hybrid network 44 has the functions of releasing and closing the public line. The hybrid network 44 includes a two-wire-to-four-wire conversion circuit for separating transmission data or reception data for facsimile data, a canceller for preventing transmission data from returning back along a reception path, and a filer circuit. The hybrid network 44 is connected to the public line, the codec 40, a serial I/F (interface) 41 and a ground line. A transmission amplifier 42 intervenes between the codec 40 and the hybrid network 44.

The codec 40 has the functions of the DC-AC conversion and the AC-DC conversion for facsimile transmission data and facsimile reception data. The public line, the external telephone 3, the hybrid network 44 and the serial I/F 41 are connected to the codec 40 via the transmission amplifier 42 or a tone amplifier 43. The transmission amplifier 42 is used to conduct the gain adjustment for the transmission data. The tone amplifier 43 is a differential amplifier having differential inputs respectively connected to the terminals L1 and L2 for the public line 31.

When a tone signal arrives at the line I/F 19 from the public line 31 or the external telephone 3, the tone signal passes through the tone amplifier 43, the codec 40, the serial I/F 41, the isolator 35, and the modem 20 in this order. Then, a tone detection signal is supplied from the codec 40 to the CPU 11.

A ring detection circuit 39 is connected to the public line, the external telephone 3 and the serial I/F 41. When a ring signal arrives at the line I/F 19 from the public line 31, a ring detection signal having the same cycle as the ring signal passes through the ring detection circuit 39, the serial I/F 41, a capacitor 35a of the isolator 35 in this order. Then, the Low to High transition or High to Low transition of the ring detection signal is detected by the CPU 11.

The DAA IC 33 has the function of adjusting impedance thereof by controlling a base level of a transistor 45 so that a voltage of the public line in a closed state to be detected by the voltage detection circuit 34 has a predetermined voltage-current property. The serial I/F 41 serves to combine signals such as a ring detection signal from the ring detection circuit 39 and facsimile reception data from the codec 40 into serial data to be outputted through the capacitor 35a of the isolator 35, and to separate control signals for causing the DAA IC 33 to release or close the public line 31 and facsimile transmission data for the codec 40 from a serial signal inputted thereto via the capacitor 35b of the isolator 35.

Hereafter, a control process for detecting a state of the external telephone 3 to be executed under control of the CPU 11 of the facsimile device 1 will be explained with reference to FIGS. 3 and 4. By the control process, whether the external telephone 3 is in an on-hook state or an off-hook state is detected.

Figure 3:
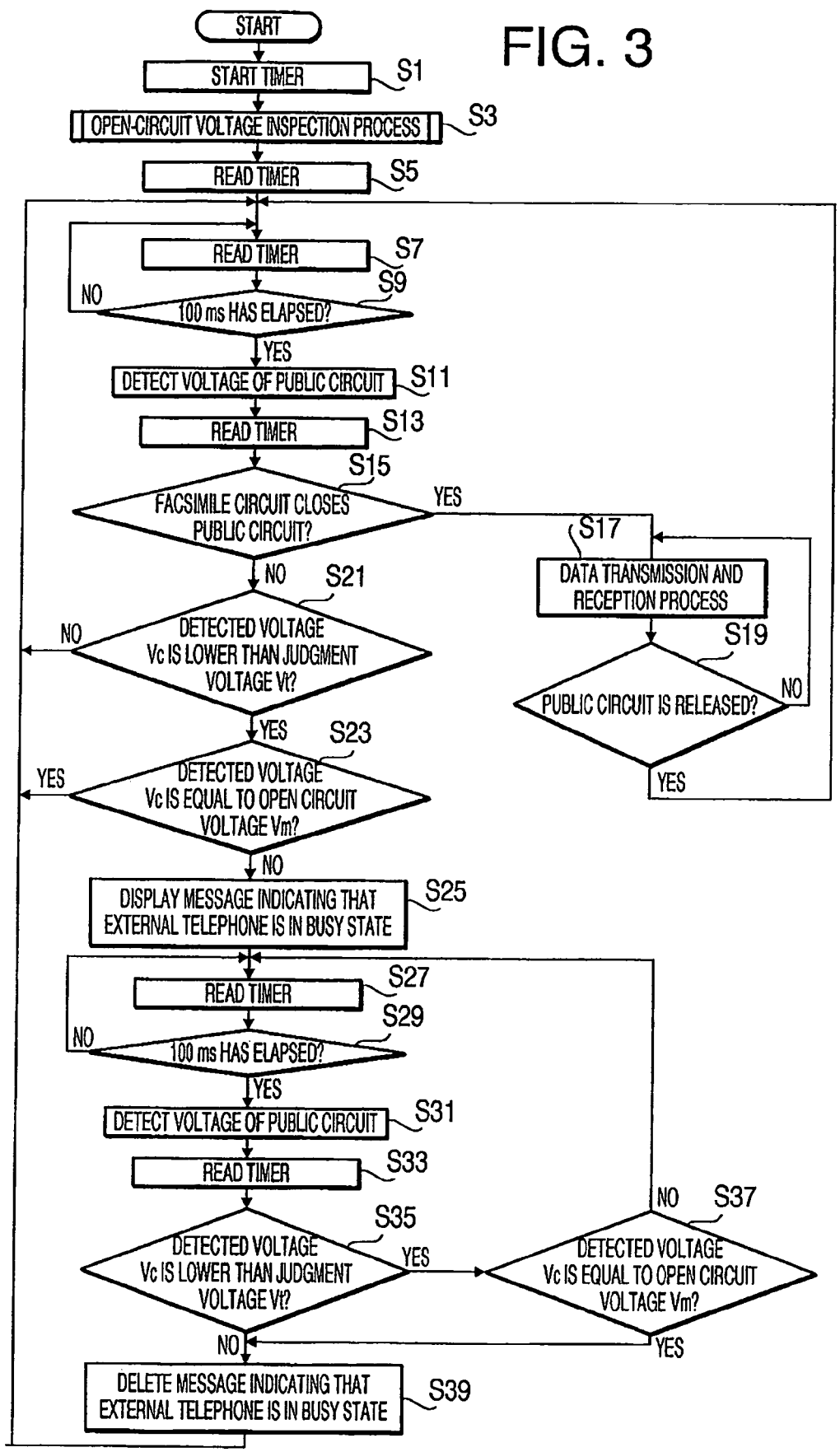
FIG. 3 is a flowchart illustrating a control process for detecting a state of an external telephone executed by the facsimile device in accordance with a first embodiment of the invention.
Figure 4:
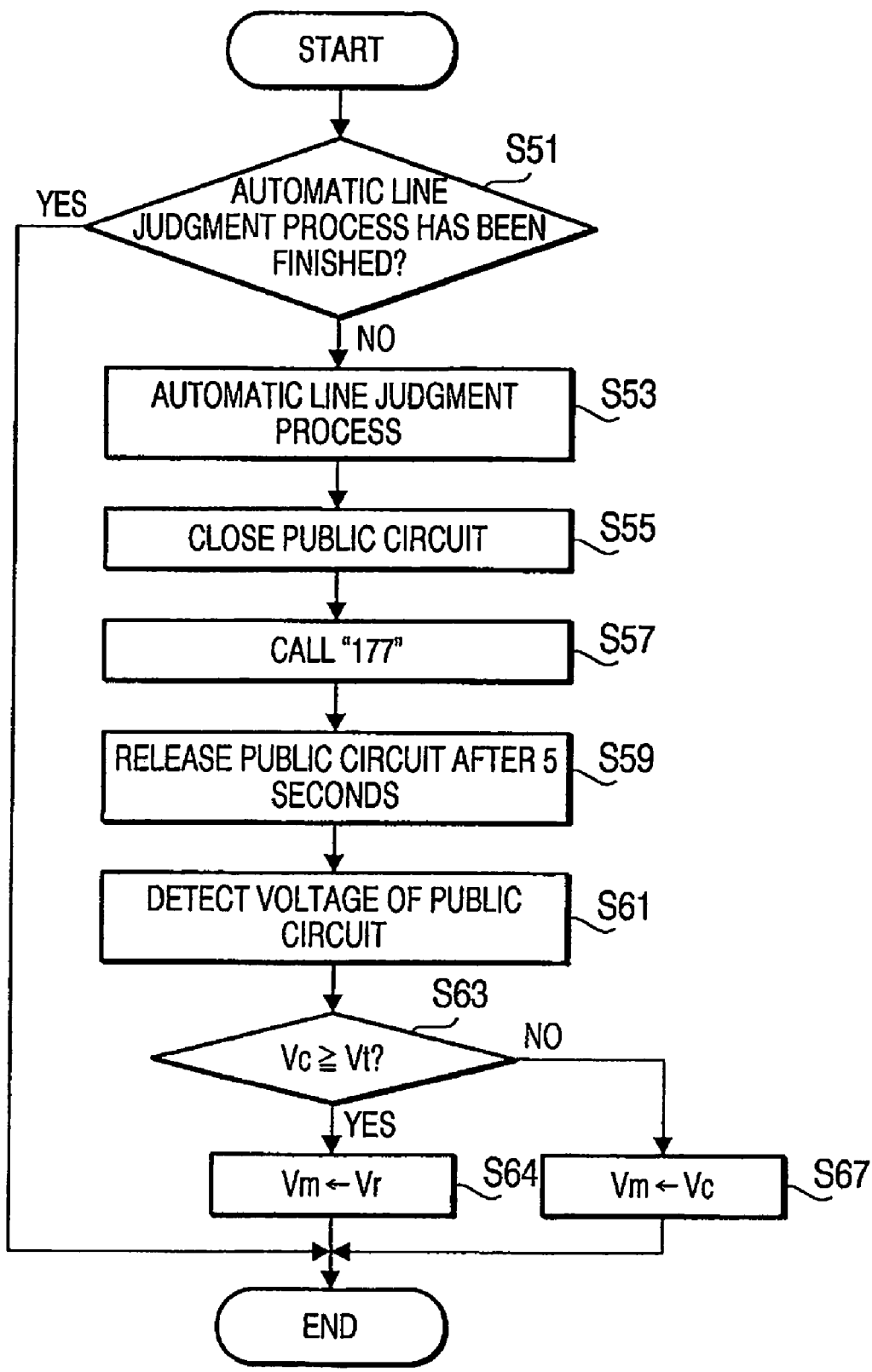
FIG. 4 is a flowchart illustrating an open-circuit voltage inspection process executed by the facsimile device in accordance with a first embodiment of the invention.

When the control process shown in FIG. 3 is initiated, an internal timer is activated (step S1). In step S3, the public line 32 (31) is closed regardless of a data communication state (i.e., regardless of data transmission/reception for a TEL signal or a FAX signal), and thereafter the public line 32 (31) is released and the voltage of the public line 32 (31) at a time when the public line 32 is released is detected. Hereafter, the voltage of the public line 32 detected at the time when the public line is released is referred to as an open-circuit voltage Vm. A process of step S3 will be described in detail later with reference to FIG. 4.

Next, a current time indicated by the internal timer is read from the internal timer, and the current time is stored in the RAM 14 (step S5). In steps S7 to S13, the CPU 11 detects a voltage of the public line 32 at predetermined time intervals (100 ms intervals in this embodiment). Specifically, the CPU 11 reads a current time from the internal timer activated in step S1 (step S7), and compares the current time with the time stored in the RAM 14 so as to judge whether a predetermined time has elapsed from a time when the voltage of the public line 32 is previously detected (step S9).

If the predetermined time has not elapsed from the time of the previous detection of the voltage of the public line (S9: NO), steps S7 and S9 are repeated. If the predetermined time has elapsed from the time of the previous detection of the voltage of the public line (S9: YES), control proceeds to step S11 where the voltage of the public line 32 is detected by the voltage detection circuit 34. Then, a current time is read from the internal timer and is stored in the RAM (S13). Hereafter, the voltage of the public line detected by the voltage detection unit 34 is referred to as a detected line voltage Vc.

Next, in step S15, the CPU 11 judges whether the facsimile circuit (the DAA IC 33) closes the public line 32 (i.e., whether the facsimile device 1 is in a data transmission/reception state for facsimile data). If the facsimile circuit (the DAA IC 33) closes the public line 32 (S15: YES), a data communication process for transmitting/receiving facsimile data is executed (S17). Then, the CPU 11 judges whether the data communication process for facsimile data is finished (i.e., whether the facsimile circuit releases the public line 32) (S19).

If it is judged in step S19 that the data communication process for facsimile data is finished and the public line 32 is released (S19: YES), control returns to step S7 to repeatedly detect the voltage of the public line 32 at the predetermined time intervals again.

It should be noted that the judgment on whether the facsimile circuit 32 closes the public line 32 is not conducted by judging whether a voltage difference between the standby voltage Vr and the detected line voltage Vc becomes larger than a predetermined voltage difference ΔV (i.e., whether the detected line voltage Vc becomes lower than the judgment voltage Vt), but is conducted by judging whether the CPU 11 issues a command for conducting a data communication process for facsimile data. In addition, the judgment on whether the facsimile circuit 32 releases the public line 32 is not conducted by judging whether a voltage difference between the standby voltage Vr and the detected line voltage Vc becomes smaller than or equal to the predetermined voltage difference ΔV (i.e., whether the detected line voltage Vc becomes higher than or equal to the judgment voltage Vt), but is conducted by judging whether the CPU 11 issues a stop command for stopping a data communication process for facsimile data.

If it is judged in step S15 that the facsimile circuit (the DAA IC 33) releases the public line 32 (i.e., the facsimile device is not in a data communication process for facsimile data) (S15: NO), the CPU 11 judges whether the detected line voltage Vc is lower than the judgment voltage Vt so as to judge whether the external telephone 3 closes the public line 32 (S21).

If the detected line voltage Vc is higher than or equal to the judgment voltage Vt (S21: NO), the CPU 11 judges that the external telephone 3 releases the public line 32 and therefore control returns to step S7 without displaying a warning message indicating that the external telephone is in a busy state on the LCD 5. In this case, the voltage of the public line 32 is repeatedly detected at the predetermined time intervals again.

If the detected line voltage Vc is lower than the judgment voltage Vt (S21: YES), the CPU 11 judges whether the detected line voltage Vc is equal to the open-circuit voltage Vm, considering that there is a possibility that the external telephone 3 has closed the public line 32 (S23).

A situation where the detected line voltage Vc is equal to the open-circuit voltage Vm corresponds to the case where "even if the facsimile circuit releases the public line 32, the voltage of the public line 32 does not immediately recover to the standby voltage Vr, but stays at an intermediate voltage lower than the judgment voltage Vt for a predetermined time and thereafter recovers to the standby voltage Vr because a digital service unit intervenes between the facsimile device 1 and the external telephone 3". Therefore, if the detected line voltage Vc is equal to the open-circuit voltage Vm (S23: YES), control returns to step S7 without displaying a warning message indicating that the external telephone is in a busy state on the LCD 5. In this case, the voltage of the public line 32 is repeatedly detected at the predetermined time intervals again.

If the detected line voltage Vc is not equal to the open-circuit voltage Vm (i.e., the detected line voltage Vc is different from the open-circuit voltage Vm) (S23: NO), it is considered that the external telephone 3 closes the public line 32. Therefore, in the case, a warning message indicating that the external telephone is in a busy state is displayed on the LCD 5 (S25). In this embodiment, the CPU 11 judges that the detected line voltage Vc is equal to the open-circuit voltage Vm if the detected line voltage Vc lies within a predetermined voltage range including the open-circuit voltage Vm. In other words, the CPU 11 judges that the detected line voltage Vc is different from the open-circuit voltage Vm if the detected line voltage Vc does not lie within the predetermined voltage range including the open-circuit voltage Vm.

The predetermined voltage range including the open-circuit voltage Vm may be determined empirically. For example, the predetermined voltage range including the open-circuit voltage Vm is a range from −10% to +10% with respect to the open-circuit voltage Vm.

Meanwhile, if the detected line voltage Vc is lower than the judgment voltage Vt and is different from the open-circuit voltage Vm (S23: NO), it is considered that the external telephone 3 closes the public line 32 and is using the public line 32. It is impossible to use the facsimile device 1 and the external telephone concurrently. Therefore, if the CPU 11 judges that the external telephone 3 is in a busy state, the CPU 11 displays a warning message indicating that the external telephone is in a busy state on the LCD 5 (S25). In this case, the CPU 11 continues to monitor a status of the external telephone 3 (steps for S27).

In steps S27 to S33, the voltage of the public line 32 is repeatedly detected at the predetermined time intervals (100 ms intervals in this embodiment) as in the case of steps S7 to S13.

Next, in step S35, the CPU 11 judges whether the detected line voltage Vc is lower than the judgment voltage Vt. If the detected line voltage Vc is lower than the judgment voltage Vt (S35: YES), the CPU 11 judges whether the detected line voltage Vc is equal to the open-circuit voltage Vm (S37). If the detected line voltage Vc is different from the open-circuit voltage Vm (S37: NO), it is considered that the public line is closed by the external telephone 3. Therefore, in this case, control returns to step S27 without deleting the warning message indicating that the external telephone is in a busy state, and thereafter the voltage of the public line 32 is repeatedly detected at the predetermined time intervals (S27 to S33).

If it is judged in step S35 that the detected line voltage Vc is higher than or equal to the judgment voltage Vt (S35: NO), or it is judged in step S37 that the detected line voltage Vc is equal to the open-circuit voltage Vm (S37: YES), it is considered that the external telephone 3 releases the public line 32. Therefore, in this case, the CPU 11 deletes the warning message indicating that the external telephone is in a busy state (S39). Then, control returns to step S7, and thereafter the voltage of the public line 32 is repeatedly detected at the predetermined time intervals (S7 to S13).

Hereafter, a process for detecting the open-circuit voltage Vm executed in step S3 will be described with reference to FIG. 4. As described above, this process (step S3) is executed when the facsimile device is turned to ON regardless of the data communication state (i.e., regardless of data communication for a TEL (telephone) signal or a FAX (facsimile) signal).

After the facsimile device 1 is turned to ON and the internal timer is activated, the CPU 11 judges whether an automatic line judgment process (S53), in which whether the public line 32 connected to the facsimile device 1 is a touch-tone phone line or a dial phone line is judged, has been already conducted (S51). In this embodiment, the judgment on whether the automatic line judgment process (S53) has been already conducted is made as follows. If a flag which is stored in the EEPROM 13 in the case where the public line 32 is judged to be a touch-tone phone line, or a flag which is stored in the EEPROM 13 in the case where the public line 32 is judged to be a dial phone line exists in the EEPROM 13, the CPU 11 judges that the automatic line judgment process has been already conducted. If such flags are not found in the EEPROM 13, the CPU 11 judges that the automatic line judgment process has not been conducted yet.

If it is judged in step S51 that the automatic line judgment process has been already conducted (S51: YES), the process for detecting the open-circuit voltage Vm (hereafter, referred to as an open-circuit voltage inspection process) terminates. Then, control proceeds to step S5 of the control process. If it is judged in step S51 that the automatic line judgment process has not been conducted yet (S51: NO), steps for detecting the open-circuit voltage Vm are processed as follows.

The CPU 11 closes the public line 32, and calls a party capable of automatically replying to the call, such as a party of a time forecast or a weather forecast (e.g., the phone number "117") (S55, S57). Subsequently, the CPU 11 releases the public line 32 after a predetermined time (e.g. 5 seconds) elapses (S59). Then, the CPU 11 detects the voltage of the public line 32 at the time when the facsimile device 1 releases the public line 32 (S61).

The CPU 11 judges whether the detected line voltage Vc detected in step S61 is higher than or equal to the judgment voltage Vt (S63). If the detected line voltage Vc is higher than or equal to the judgment voltage Vt (S63: YES), the standby voltage Vr is stored in the EEPROM 13 as the open-circuit voltage Vm (S65). If the detected line voltage Vc is lower than the judgment voltage Vt (S63: NO), the detected voltage Vc is stored in the EEPROM 13 as the open-circuit voltage Vm (S67). Then, the open-circuit voltage inspection process terminates.

Hereafter, the reason why the standby voltage Vr is stored in the EEPROM 13 as the open-circuit voltage Vm if it is judged in step S61 that the detected line voltage Vc detected in step S61 is higher than or equal to the judgment voltage Vt, while the detected voltage Vc is stored in the EEPROM 13 as the open-circuit voltage Vm if the detected line voltage Vc is lower than the judgment voltage Vt will be explained.

As described above, if a digital service unit intervenes between the facsimile device 1 and communication devices (the external telephone 3 and the facsimile device 1), there is a possibility that after the facsimile device 1 releases the public line 32, the voltage of the public line 32 does not immediately recover to the standby voltage Vr, but stays at an intermediate voltage which is lower than the judgment voltage Vt for a predetermined time. Therefore, in the case where the open-circuit voltage Vm stays at an intermediate voltage lower than the judgment voltage Vt, the facsimile device 1 may erroneously judge that the external telephone 3 closes the public line 32 even if the external telephone 3 has released the public line 32.

On the other hand, in the case where the open-circuit voltage Vm is higher than the judgment voltage Vt and the voltage of the public line 32 stays at the open-circuit voltage Vm for a predetermined time period after the facsimile circuit releases the public line 32, the facsimile device does not judge erroneously that the external telephone 3 closes the public line 32 even if the external telephone 3 has released the public line 32.

Therefore, if the open-circuit voltage Vm is higher than the judgment voltage Vt, it is possible to appropriately judge whether the public line 32 is in a released state or a closed state based on the judgment on whether the detected line voltage Vc is lower than the judgment voltage Vt. In other words, if the open-circuit voltage Vm is higher than the judgment voltage Vt, it is possible to regard the open-circuit voltage Vm as the standby voltage Vr. The facsimile device 1 does not erroneously judge that the external telephone 3 closes the public line 32 even if the external telephone has released the public line.

For this reason, in the open-circuit voltage inspection process (FIG. 3) according to the embodiment, if the open-circuit voltage Vm is higher than the judgment voltage Vt, the standby voltage Vr is stored in the EEPROM as the open-circuit voltage Vm.

In the open-circuit voltage inspection process (FIG. 3) according to the embodiment, if the voltage of the public line 32 detected in the open-circuit voltage inspection process is higher than or equal to the judgment voltage Vt, the standby voltage Vr is assigned to the open-circuit voltage Vm. Therefore, in the case where the standby voltage Vr is stored as the open-circuit voltage Vm, if it is judged in step S21 of the flowchart of FIG. 3 that the detected line voltage Vc is lower than the judgment voltage Vt (S21: YES), the facsimile device 1 consequently judges that the detected line voltage Vc is different from the open-circuit voltage Vm (S23: NO).

According to the open-circuit voltage inspection process of the first embodiment, in the case where the voltage of the public line 32 is higher than or equal to the judgment voltage Vt, the facsimile device 1 judges that the external telephone 3 releases the public line 32 if the voltage difference between the detected line voltage Vc at the time when the facsimile circuit has released the public line and the standby voltage Vr (the reference voltage) is smaller than a predetermined voltage difference, while the facsimile device 1 judges that the external telephone 3 closes the public line 32 if the voltage difference between the detected line voltage Vc at the time when the facsimile circuit has released the public line and the standby voltage Vr is larger than the predetermined voltage difference. It should be noted that such a judgment is equivalent to that a judgment conducted in the case where a digital service unit does not intervene between the public line 32 and the communication devices (the facsimile device 1 and the external telephone 3).

In addition, in the case where the voltage of the public line 32 is lower than the judgment voltage Vt, the facsimile device 1 judges that the external telephone 3 releases the public line 32 if the voltage difference between the detected line voltage Vc at the time when the facsimile circuit has released the public line and the standby voltage Vr is smaller than a predetermined voltage difference or if the detected line voltage Vc at the time when the facsimile circuit has releases the public line is equal to the open-circuit voltage Vm, while the facsimile device 1 judges that the external telephone 3 closes the public line 32 if the voltage difference between the detected line voltage Vc at the time when the facsimile circuit has released the public line and the standby voltage Vr is larger than or equal to the predetermined voltage difference and if the detected line voltage Vc at the time when the facsimile circuit has released the public line is different from the open-circuit voltage Vm.

Hereafter, the feature of the facsimile device 1 according to the first embodiment will be explained. As described above, the problem, that the facsimile device 1 may judge erroneously that the external telephone 3 closes the public line 32 even if the external telephone 3 has released the public line 32, is caused by the fact that the voltage of the public line 32 is kept at an intermediate voltage after the facsimile circuit releases the public line.

By contrast, according to the first embodiment, in the case where the open-circuit voltage Vm is kept at an intermediate voltage which is lower than the judgment voltage Vt, the facsimile device 1 judges that the external telephone 3 releases the public line 32 as long as the detected line voltage Vc at the time when the facsimile circuit has released the public line is equal to the open-circuit voltage Vm, even if the detected line voltage Vc is lower than the judgment voltage Vt. Therefore, it is possible to prevent the facsimile device 1 from erroneously judging that the external telephone 3 closes the public line 32 even if the external telephone 3 has released the public line 32.

Since the facsimile device 1 (facsimile circuit) is connected to the public line 32 in parallel with the external telephone 3, it is impossible to make both the facsimile device 1 and the external telephone 3 perform data communications concurrently. For this reason, in this embodiment, a warning message indicating that the external telephone 3 is in a busy state is displayed on the LCD 5 while the public line 32 is closed by the external telephone 3 so as to prevent a user from erroneously operate the facsimile device 1 while the external telephone 3 is in a busy sate. If the external telephone 3 releases the public line 32, the warning message that the external telephone 3 is in a busy state is deleted from the LCD 5 so as to notify the user that the facsimile device 1 has moved to a ready state.

As described above, if a digital service unit intervenes between the facsimile device 1 and the communication devices (the external telephone 3 and the facsimile device 1), there is a possibility that after the facsimile circuit releases the public line 32, the voltage of the public line 32 does not immediately recover to the standby voltage Vr, but stays at an intermediate voltage which is lower than the judgment voltage Vt. That is, there is a possibility that after the external telephone 3 releases the public line 32, the voltage of the public line 32 does not immediately recover to the standby voltage Vr, but stays at an intermediate voltage which is lower than the judgment voltage Vt, and thereafter recovers to the standby voltage Vr. In such a case, a user may erroneously judge that the facsimile device 1 is out of order because the warning message indicating that the external telephone 3 is in a busy state stays on the LCD 5 even if the external telephone 3 has released the public line 32.

By contrast, according to the embodiment, in the case where the open-circuit voltage Vm is kept at an intermediate voltage which is lower than the judgment voltage Vt, the facsimile device 1 judges that the external telephone 3 releases the public line 32 as long as the detected line voltage Vc is equal to the open-circuit voltage Vm, even if the detected line voltage Vc is lower than the judgment voltage Vt. Therefore, it is possible to prevent the facsimile device 1 from erroneously judging that the external telephone closes the public line 32 even if the external telephone 3 has released the public line 32.

It becomes possible to prevent the facsimiled device 1 from continuing to display a warning message indicating that the external telephone is in a busy state even if the external telephone 3 has released the public line 32. Therefore, it is possible to prevent a user from erroneously judging that the facsimile device 1.

As a public line, a touch-tone phone line and a dial phone line having different data formats are widely used. Therefore, it is necessary to check the type of the public line before connecting a device to the public line.

If the external telephone closes the public line, the facsimile device may become unable to check the type of the public line. In this case, it is necessary to check whether the external telephone releases the public line before checking the type of the public line. Similarly, if the external telephone closes the public line, it may become impossible to properly detect an open-circuit voltage.

By contrast, according to the embodiment, the open-circuit voltage Vm is detected concurrently with the automatic judgment for the type of the public line to which the facsimile circuit is connected. Therefore, according to the embodiment, it is possible to detect the open-circuit voltage Vm in a state in which the external telephone releases the public line 32. Since the open-circuit voltage Vm is properly detected, it becomes possible to appropriately judge whether the external telephone 3 closes the public line 32 or releases the public line 32.

Second Embodiment

Hereafter, a control process and an open-circuit voltage inspection process according to a second embodiment will be described. The feature of the facsimile device according to the second embodiment is that even if the voltage of the public line 32 and the open-circuit voltage Vm, detected when the external telephone 3 closes the public line 32, are equal to each other, the facsimile device is able to properly judge whether the external telephone 3 closed the public line 32. Since the block diagram of the facsimile device according to the second embodiment is the same as that of the first embodiment, FIGS. 1 and 2 are used in the following explanations.

FIGS. 5 and 6 show a flowchart of the control process executed under control of the CPU 11.

When the control process shown in FIG. 5 is initiated, an internal timer is activated (step S101). In step S103, the open-circuit voltage inspection process is executed. Next, a current time indicated by the internal timer is read from the internal timer, and the current time is stored in the RAM 14 (step S105). In steps S107 to S113, the CPU 11 detects a voltage of the public line 32 at predetermined time intervals (100 ms intervals in this embodiment). Specifically, the CPU 11 reads a current time from the internal timer activated in step S101 (step S107), and compares the current time with the time stored in the RAM 14 so as to judge whether a predetermined time has elapsed from a time when the voltage of the public line 32 is previously detected (step S109).

If the predetermined time has not elapsed from the time of the previous detection of the voltage of the public line (S109: NO), steps S107 and S109 are repeated. If the predetermined time has elapsed from the time of the previous detection of the voltage of the public line (S109: YES), control proceeds to step S111 where the voltage of the public line 32 is detected by the voltage detection circuit 34. Then, a current time is read from the internal timer and is stored in the RAM 14 (S13).

Next, in step S115, the CPU 11 judges whether the facsimile circuit (the DAA IC 33) closes the public line 32 (i.e., whether the facsimile device 1 is in a data transmission/reception state for facsimile data). If the facsimile circuit (the DAA IC 33) closes the public line 32 (S115: YES), a data communication process for transmitting/receiving facsimile data is executed (S117). Then, the CPU 11 judges whether the data communication process for facsimile data is finished (i.e., whether the facsimile circuit releases the public line 32) (S119).

If it is judged in step S119 that the data communication process for facsimile data is finished and the public line 32 is released (S119: YES), control returns to step S107 to repeatedly detect the voltage of the public line 32 at the predetermined time intervals again.

If it is judged in step S115 that the facsimile circuit (the DAA IC 33) releases the public line 32 (i.e., the facsimile device is not in a data communication process for facsimile data) (S115: NO), the CPU 11 judges whether the detected line voltage Vc is lower than the judgment voltage Vt so as to judge whether the external telephone 3 closes the public line 32 (S121).

If the detected line voltage Vc is higher than or equal to the judgment voltage Vt (S121: NO), the CPU 11 judges that the external telephone 3 releases the public line 32 and therefore control returns to step S107 without displaying a warning message indicating that the external telephone is in a busy state on the LCD 5. In this case, the voltage of the public line 32 is repeatedly detected at the predetermined time intervals again.

If the detected line voltage Vc is lower than the judgment voltage Vt (S121: YES), the CPU 11 judges whether the detected line voltage Vc is equal to the open-circuit voltage Vm, considering that there is a possibility that the external telephone 3 has closed the public line 32 (S123).

If the detected line voltage Vc is not equal to the open-circuit voltage Vm (i.e., the detected line voltage Vc is different from the open-circuit voltage Vm) (S123: NO), it is considered that the external telephone 3 closes the public line 32. Therefore, in the case, a warning message indicating that the external telephone is in a busy state is displayed on the LCD 5 (S125). As in the case of the first embodiment, the CPU 11 judges that the detected line voltage Vc is equal to the open-circuit voltage Vm if the detected line voltage Vc lies within a predetermined voltage range including the open-circuit voltage Vm. In other words, the CPU 11 judges that the detected line voltage Vc is different from the open-circuit voltage Vm if the detected line voltage Vc does not lie within the predetermined voltage range including the open-circuit voltage Vm.

In steps S127 to S133, the voltage of the public line 32 is repeatedly detected at the predetermined time intervals (100 ms intervals in this embodiment) as in the case of steps S107 to S113.

Next, in step S135, the CPU 11 judges whether the detected line voltage Vc is lower than the judgment voltage Vt. If the detected line voltage Vc is lower than the judgment voltage Vt (S135: YES), the CPU 11 judges whether the detected line voltage Vc is equal to the open-circuit voltage Vm (S137). If the detected line voltage Vc is different from the open-circuit voltage Vm (S137: NO), it is considered that the public line is closed by the external telephone 3. Therefore, in this case, control returns to step S127 without deleting the warning message indicating that the external telephone is in a busy state, and thereafter the voltage of the public line 32 is repeatedly detected at the predetermined time intervals (S127 to S133).

If it is judged in step S135 that the detected line voltage Vc is higher than or equal to the judgment voltage Vt (S135: NO), or it is judged in step S137 that the detected line voltage Vc is equal to the open-circuit voltage Vm (S137: YES), it is considered that the external telephone 3 releases the public line 32. Therefore, in this case, the CPU 11 deletes the warning message indicating that the external telephone is in a busy state (S139). Then, control returns to step S107, and thereafter the voltage of the public line 32 is repeatedly detected at the predetermined time intervals (S107 to S113).

If the detected line voltage Vc is equal to the open-circuit voltage Vm (S123: YES), a current time is read form the internal time activated in step S101, and is stored in the RAM 14 (S141). Then, a current time is read from the internal timer (S143), and is compared with the time stored in the RAM 14 so as to judge whether a predetermined time Tm has elapsed form a time when it is judged that the detected line voltage Vc is equal to the open-circuit voltage Vm (S145).

The predetermined time Tm is longer than or equal to a time period during which the voltage difference between the standby voltage Vr and the voltage of the public line 32 reaches a voltage value lower than the voltage difference between the standby voltage Vr and the judgment voltage Vt from a time when the facsimile circuit releases the public line 32. In other words, the predetermined time Tm is longer than or equal to a time during which the open-circuit voltage Vm detected in step S103 is maintained.

Since the time value of the internal time is read at 100 ms intervals, a time when the time value of the internal timer is read in step S141 substantially coincide with a time when the facsimile circuit releases the public line 32. Therefore, the judgment of step S145 corresponds to a judgment on whether the predetermined time Tm has elapsed form the time when the facsimile circuit releases the public line 32.

If the predetermined time Tm has not elapsed form the time when the facsimile circuit releases the public line 32 (S145: NO), control proceeds to step S147 where the CPU 11 judges whether the detected line voltage Vc is equal to the open-circuit voltage Vm. A criterion for the judgment on whether the detected line voltage Vc is equal to the open-circuit voltage Vm may be the same as that of the first embodiment.

If the detected line voltage Vc is not equal to the open-circuit voltage Vm (S147: NO), control returns to step S107 to repeatedly detect the voltage of the public line 32 at the predetermined time intervals (S107 to S113). If the detected line voltage Vc is equal to the open-circuit voltage Vm (S147: YES), control returns to step S143 where a value of the internal timer is read again.

In step S147, the CPU 11 monitors the voltage of the public line 32 by checking whether the voltage of the public line 32 measured after the facsimile circuit releases the public line 32 is maintained at the open-circuit voltage Vm for the predetermined time Tm. If the detected line voltage Vc changes to a value different from the open-circuit voltage Vm before the predetermined time Tm elapses, it is considered that the effect on the voltage of the public line 32 by the digital service unit, which intervenes between the public line 32 and the communication devices (the facsimile device 1 and the external telephone 3), disappears.

In this embodiment, if the detected line voltage Vc changes to a value different from the open-circuit voltage Vm before the predetermined time Tm elapses (S147: NO), control returns to step S107 so as to judge whether the external telephone 3 closes the public line 32 in step S121 or S123.

If the predetermined time Tm has elapsed form the time when the facsimile circuit releases the public line 32 (S145: YES), control proceeds to step S151 where the CPU 11 judges whether the detected line voltage Vc is lower than the judgment voltage Vt. If the detected line voltage Vc is higher than equal to the judgment voltage Vt (S151: NO), control returns to step S107 to repeatedly detect the voltage of the public line 32 at the predetermined time intervals (S107 to S113).

If the CPU 11 judges whether the detected line voltage Vc is lower than the judgment voltage Vt (S151: YES), it is considered that the external telephone 3 closes the public line 32, and therefore a warning message indicating that the external telephone is in a busy state is displayed on the LCD 5 (S153).

Then, a current time is read from the internal timer, and is stored in the Ram 14 (S155). Subsequently, in steps S157 to S163) the voltage of the public line 32 is read repeatedly at the predetermined intervals (100 ms intervals in this embodiment) as in the case of steps S157 to S163).

In step S165, the CPU 11 judged whether the detected line voltage Vc detected in step S163 is lower than the judgment voltage Vt. If the detected line voltage Vc is higher than or equal to the judgment voltage Vt (S165: NO), it is considered that the external telephone 3 releases the pubic circuit 32, and therefore the warning message indicating that the external telephone is in a busy state is deleted (S167). Then, control returns to step S107 to repeatedly detect the voltage of the public line 32 at the predetermined time intervals (S107 to S113).

If the detected line voltage Vc is lower than the judgment voltage Vt (S165: YES), it is considered that the external telephone 3 continues to close the public line 32, and therefore control returns to step S157 to repeatedly detect the voltage of the public line 32 at the predetermined time intervals (S157 to S163) without displaying the warning message indicating that the external telephone is in a busy state.

Figure 7:
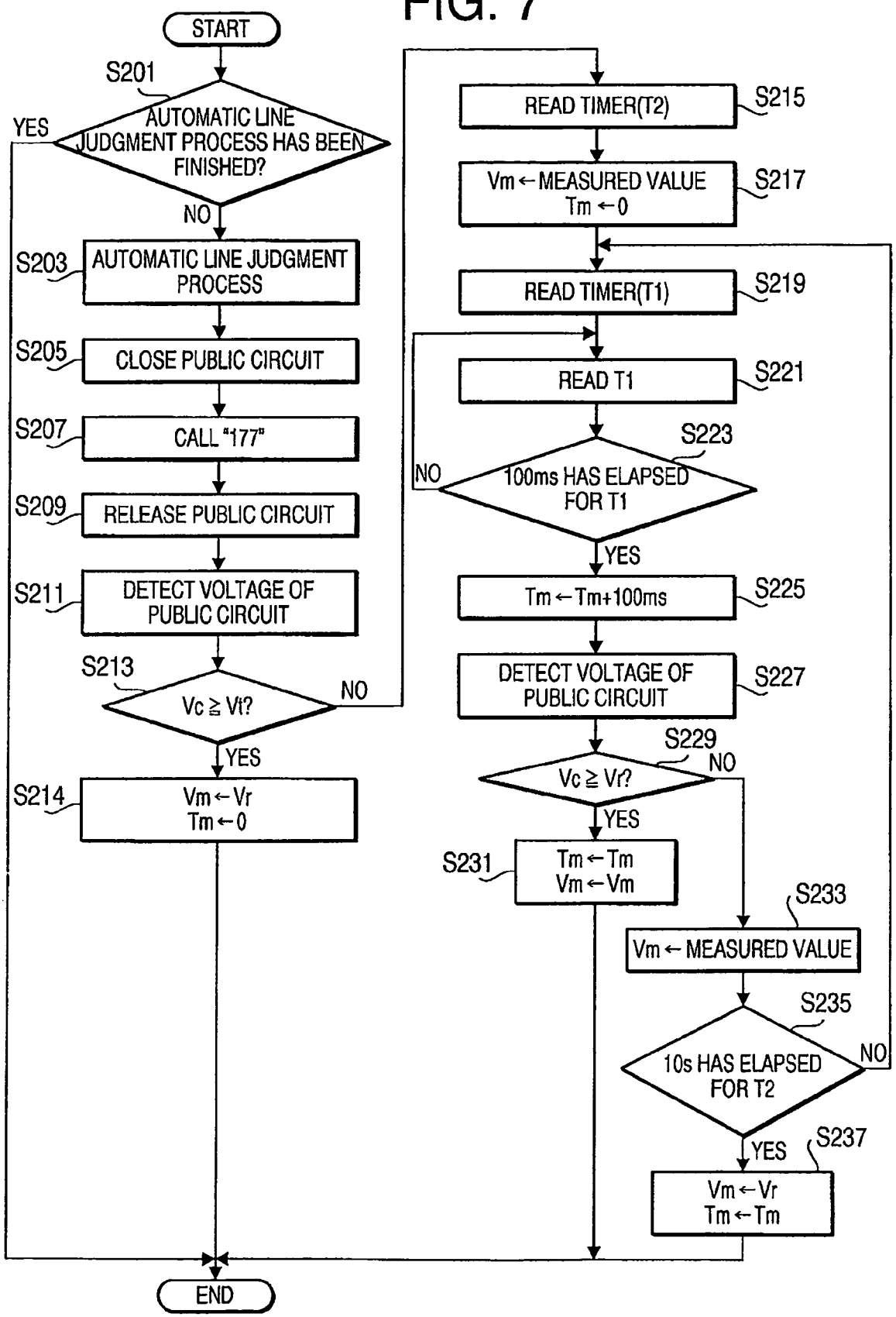
FIG. 7 is a flowchart illustrating an open-circuit voltage inspection process executed by the facsimile device in accordance with a second embodiment of the invention.
Figure 8:
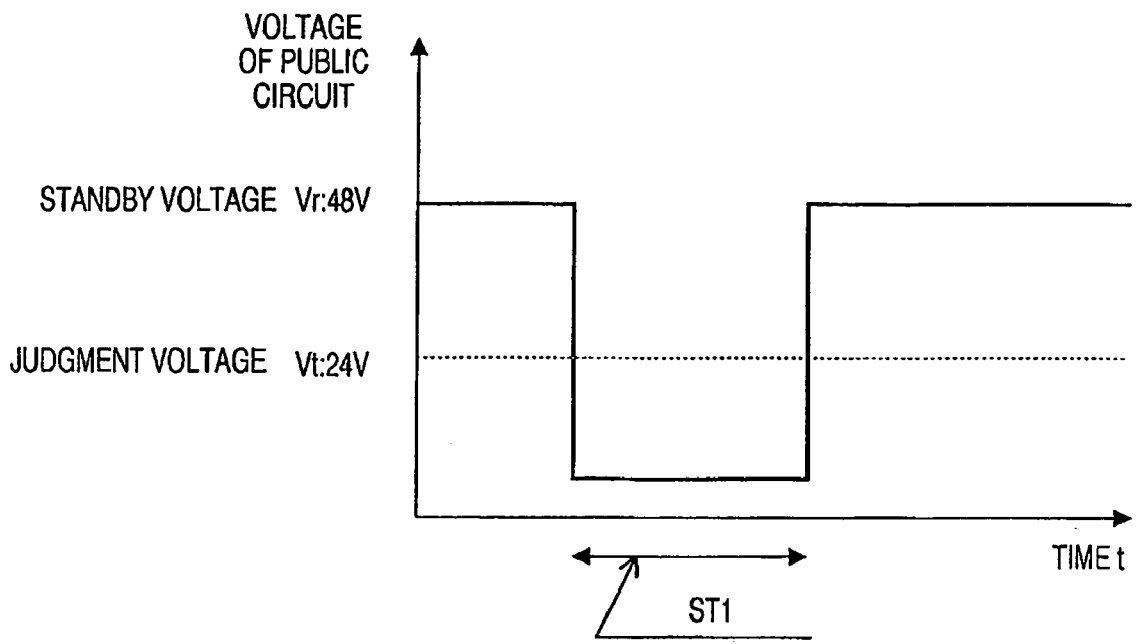
FIG. 8 is a graph illustrating change of a voltage of a public line in a situation where a digital service unit does not intervene between the public line and communication devices.
Figure 9:
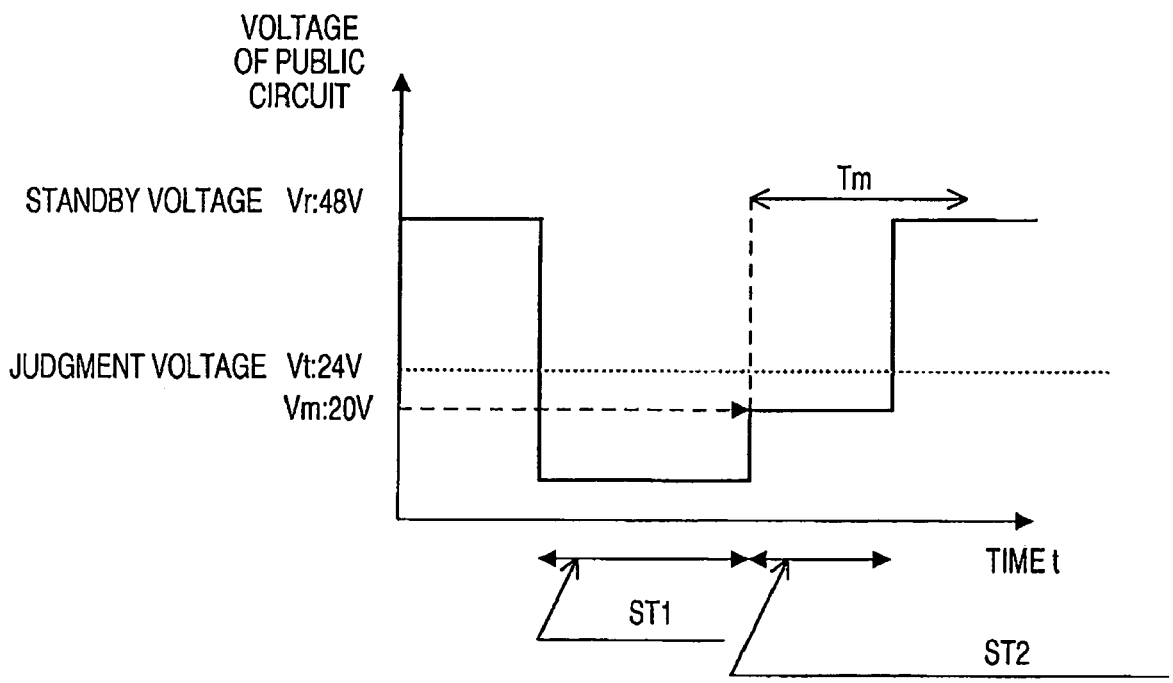
FIG. 9 is a graph illustrating change of a voltage of a public line in a situation where a digital service unit intervenes between the public line and communication devices.

Hereafter, the open-circuit voltage inspection process executed in step S103 of the control process will be described. FIG. 7 is a flowchart illustrating the open-circuit voltage inspection process. As described above, the open-circuit voltage inspection process (S103) is executed when the facsimile device 1 turned to ON regardless of the data transmission/reception of a TEL signal or a FAX signal.

When the open-circuit voltage inspection process is initiated, the CPU 11 judges whether an automatic line judgment process (S203), in which whether the public line 32 connected to the facsimile device 1 is a touch-tone phone line or a dial phone line is judged, has been already conducted (S201). As in the case of the first embodiment, the judgment on whether the automatic line judgment process (S203) has been already conducted is made as follows. If a flag which is stored in the EEPROM 13 in the case where the public line 32 is judged to be a touch-tone phone line, or a flag which is stored in the EEPROM 13 in the case where the public line 32 is judged to be a dial phone line exists in the EEPROM 13, the CPU 11 judges that the automatic line judgment process has been already conducted. If such flags are not found in the EEPROM 13, the CPU 11 judges that the automatic line judgment process has not been conducted yet.

If it is judged in step S201 that the automatic line judgment process has been already conducted (S201: YES), the open-circuit voltage inspection process terminates. Then, control proceeds to step S105 of the control process. If it is judged in step S201 that the automatic line judgment process has not been conducted yet (S201: NO), steps for detecting the open-circuit voltage Vm are processed as follows.

The CPU 11 closes the public line 32, and calls a party capable of automatically replying to the call, such as a party of a time forecast or a weather forecast (e.g., the phone number "117") (S205, S207). Subsequently, the CPU 11 releases the public line 32 after a predetermined time (e.g., 5 seconds) elapses (S209). Then, the CPU 11 detects the voltage of the public line 32 at the time when the facsimile device 1 releases the public line 32 (S211).

The CPU 11 judges whether the detected line voltage Vc detected in step S211 is higher than or equal to the judgment voltage Vt (S213). If the detected line voltage Vc is higher than or equal to the judgment voltage Vt (S213: YES), the standby voltage Vr is stored in the RAM 14 as the open-circuit voltage Vm, and 0 second is stored in the RAM 14 as the predetermined time Tm (S214). The reason why the standby voltage Vr is stored in the RAM 14 as the open-circuit voltage Vm if the detected line voltage Vc is higher than or equal to the judgment voltage Vt is the same as that of the first embodiment.

If the detected line voltage Vc is lower than the judgment voltage Vt (S213: NO), a current time is read form the internal timer, and the read time of the internal timer (hereafter, referred to as a time T2) is stored in the RAM 14 (S215). Then, the detected line voltage Vc detected in step S211 is stored in the RAM 14 as an initial value of the open-circuit voltage Vm, and 0 second is stored in the EEPROM 13 (S217).

Then, a current time is read from the internal timer, and the read time of the internal time (hereafter, referred to as a time T1) is stored in the RAM 14 (S219). Then, the CPU 11 judges whether a predetermined time Δt (100 ms in this embodiment) has elapsed from the time T1 stored in step S219 (S221, S223).

If the predetermined time Δt has elapsed from the time T1 stored in step S219 (S223: YES), the predetermined time Tm stored in the RAM 14 is updated by adding predetermined time Δt to the predetermined time Tm (S225). Then, the voltage of the public line 32 is detected (S227).

Next, the CPU 11 judges whether the detected line voltage Vc detected in step S227 is higher than or equal to the standby voltage Vr (S229). If the detected line voltage Vc is equal to the standby voltage Vr (S229: YES), the predetermined time Tm updated in step S225 is stored in the RAM 14 as a final value of the predetermined time Tm, and the detected line voltage Vc stored in the RAM 14 in step S217 is stored in the EEPROM 13 (S231). Then, the open-circuit voltage inspection process terminates.

The judgment on whether the detected line voltage Vc is equal to the standby voltage Vr is made by judging whether the detected line voltage Vc lies within a predetermined voltage range including the standby voltage Vr. For example, the predetermined voltage range including the standby voltage Vr is a range from −20% to +20% with respect to the open-circuit voltage Vm.

If the detected line voltage Vc is not equal to the standby voltage Vr (S229: NO), the detected line voltage Vc detected in step S227 is stored in the RAM 14 as the open-circuit voltage Vm (S233). Then, the CPU 11 judges whether a predetermined time ΔT2 has elapsed from the time T2 stored in step S215 (S235).

If the predetermined time ΔT2 has not elapsed from the time T2 stored in step S215 (S235: NO), control returns to step S219. If the predetermined time ΔT2 has elapsed from the time T2 stored in step S215 (S235: YES), the open-circuit voltage Vm updated in step S233 is stored in the EEPROM 13 as a final value of the open-circuit voltage Vm, and the predetermined time Tm updated in step S225 is stored in the EEPROM 13 as a final value of the predetermined time Tm (S237). Then, the open-circuit voltage inspection process terminates.

As in the case of the first embodiment, if the voltage of the public line detected in the open-circuit voltage inspection process is higher than or equal to the judgment voltage Vt, the value of the standby voltage Vr is assigned to the open-circuit voltage Vm. Therefore, in the case where the value of the standby voltage Vr is stored as the open-circuit voltage Vm, if the CPU 11 judges that the detected line voltage Vc is lower than the judgment voltage Vt in step S121 of FIG. 5 (S121: YES), the CPU 11 consequentially judges that the detected line voltage Vc is different from the open-circuit voltage Vm (S123: NO).

Therefore, in the case where the voltage of the public line detected in the open-circuit voltage inspection process is higher than or equal to the judgment voltage Vt, the CPU 11 judges that the external telephone 3 releases the public line 32 if a voltage difference between the standby voltage Vr (the reference voltage) and the detected line voltage Vc detected at the time when the facsimile circuit releases the public line 32 is smaller than a predetermined voltage difference, while the CPU 11 judges that the external telephone 3 closes the public line 32 if a voltage difference between the standby voltage Vr and the detected line voltage Vc detected at the time when the facsimile circuit releases the public line 32 is larger than a predetermined voltage difference.

According to the second embodiment, in the case where the voltage of the public line detected in the open-circuit voltage inspection process is lower than the judgment voltage Vt, the facsimile device 1 judges that the external telephone 3 releases the public line 32 if the voltage difference between the detected line voltage Vc at the time when the facsimile circuit releases the public line and the standby voltage Vr is smaller than a predetermined voltage difference, while the facsimile device 1 judges that the external telephone 3 closes the public line 32 if the voltage difference between the detected line voltage Vc at the time when the facsimile circuit releases the public line and the standby voltage Vr is larger than or equal to the predetermined voltage difference and if the detected line voltage Vc at the time when the facsimile circuit releases the public line is different from the open-circuit voltage Vm.

In addition, in the case where the voltage of the public line detected in the open-circuit voltage inspection process is lower than the judgment voltage Vt and the detected line voltage Vc at the time when the facsimile circuit releases the public line is equal to the open-circuit voltage Vm, the facsimile device 1 judges that the external telephone 3 releases the public line 32 if the voltage difference between the detected line voltage Vc (detected after the predetermined time Tm elapses from the time when the facsimile circuit releases the public line) and the standby voltage Vr is smaller than a predetermined voltage difference, while the facsimile device 1 judges that the external telephone 3 closes the public line 32 if the voltage difference between the detected line voltage Vc (detected after the predetermined time Tm elapses from the time when the facsimile circuit releases the public line) and the standby voltage Vr is larger than or equal to the predetermined voltage difference.

Hereafter, the feature of the facsimile device 1 according to the second embodiment will be explained. As described above, the problem, that the facsimile device 1 may judge erroneously that the external telephone 3 closes the public line 32 even if the external telephone 3 has released the public line 32, is caused by the fact that the voltage of the public line 32 is kept at an intermediate voltage after the facsimile circuit releases the public line.

According to the above mentioned first embodiment, in the case where the open-circuit voltage Vm is kept at an intermediate voltage which is lower than the judgment voltage Vt, the facsimile device 1 judges that the external telephone 3 releases the public line 32 as long as the detected line voltage Vc at the time when the facsimile circuit releases the public line is equal to the open-circuit voltage Vm, even if the detected line voltage Vc is lower than the judgment voltage Vt. Such a configuration of the first embodiment makes it possible to solve the above mentioned problem. However, a possibility, that the facsimile device 1 erroneously judges that the external telephone 3 closes the public line 32 if the voltage of the public line detected in a state where the external telephone 3 closes the public line 32 is equal to the open-circuit voltage Vm, still remains.

By contrast, according to the second embodiment, in the case where the voltage of the public line detected in the open-circuit voltage inspection process is lower than the judgment voltage Vt and the detected line voltage Vc at the time when the facsimile circuit has released the public line is equal to the open-circuit voltage Vm, the facsimile device 1 judges whether the external telephone 3 closes the public line by comparing the detected line voltage Vc with the judgment voltage Vt after the predetermined time Tm elapses from the time when the facsimile circuit releases the public line. Therefore, in the case where the voltage of the public line detected in a state where external telephone 3 closes the public line 32 is equal to the open-circuit voltage Vm, the configuration according to the second embodiment prevents the facsimile device 1 from erroneously judging that the external telephone 3 closes the public line even if the external telephone 3 has released the public line 32.

According to the second embodiment, the facsimile device 1 judges that the external telephone 3 releases the public line 32 if the detected line voltage Vc is lower than the judgment voltage Vt and if the detected line voltage Vc is equal to the open-circuit voltage Vm after the facsimile device 1 judges that the external telephone 3 has closed the public line 32 (i.e., after the warning message indicating that the external telephone is in a busy state is displayed on the LCD 5). Therefore, it is possible to prevent the facsimile device from continuing to display the warning message indicating that the external telephone is in a busy state after the external telephone 3 releases the public line 32.

As described above, if a digital service unit intervenes between the public line and the communication devices (the facsimile device 1 and the external telephone 3), the voltage of the public line is kept at an intermediate voltage for a predetermined time after the facsimile circuit releases the public line. In this embodiment, the facsimile device 1 uses a time longer than or equal to a time required for the voltage difference between the voltage of the public line and the standby voltage Vr to change to a value smaller than a voltage difference between the standby voltage Vr and the judgment voltage Vt, as the predetermined time Tm. Therefore, it is possible to securely judge whether the external telephone closes the public line.

In this embodiment, the open-circuit voltage Vm is detected concurrently with the automatic judgment for the type of the public line to which the facsimile circuit is connected. Therefore, it is possible to detect the open-circuit voltage Vm in a state where the external telephone releases the public line 32. Since the open-circuit voltage Vm is properly detected, it becomes possible to appropriately judge whether the external telephone 3 closes the public line 32 or releases the public line 32.

Although the present invention has been described in considerable detail with reference to certain preferred embodiments thereof, other embodiments are possible.

In the above mentioned embodiments, the judgment on whether the facsimile circuit 32 closes the public line 32 is made by judging whether the CPU 11 issues a command for transmitting or receiving facsimile data. However, such a judgment may be made by judging whether a voltage difference between the detected line voltage Vc and the standby voltage Vr is larger than a predetermined voltage difference $\Delta V$ (i.e., whether the detected line voltage Vc is lower than the judgment voltage Vt).

In the above mentioned embodiments, the facsimile device 1 is provided with the terminals T1 and T2 through which the external telephone 3 is connected to the facsimile device 1. However, the connection between the facsimile device 1 and the external telephone 3 may be attained by another electric component such as an external divider.

The facsimile device 1 and the external telephone 3 may be integrated into a single device. In this case, a facsimile device having a telephone function may be configured to have a handset in which a speaker for outputting transmitted sound and a microphone for picking up voice of a caller are mounted.

What is claimed is:

1. A facsimile device connected to a public line in parallel with an external telephone, comprising:
   a facsimile circuit configured to send and receive image data through the public line;
   a voltage detector that detects a voltage of the public line;
   an open-circuit voltage detector that releases the public line after closing the public line and detects an open-circuit voltage;
   a telephone status monitoring unit configured to judge whether the external telephone closes the public line or releases the public line based on the voltage of the public line detected by the voltage detector; and
   a warning unit configured to output a warning indicating that the external telephone is in a busy state if the telephone status monitoring unit judges that the external telephone closes the public line,
   wherein if a voltage difference between a reference voltage and the open-circuit voltage detected by the open-circuit voltage detector is smaller than a predetermined voltage difference, the telephone status monitoring unit operates to:
   judge that the external telephone releases the public line if a voltage difference between the reference voltage and a detected line voltage detected by the voltage detector when the facsimile circuit has released the public line is smaller than the predetermined voltage difference; and
   judge that the external telephone closes the public line if the voltage difference between the reference voltage and the detected line voltage detected by the voltage detector when the facsimile circuit has released the public line is larger than or equal to the predetermined voltage difference,
   wherein if the voltage difference between the reference voltage and the open-circuit voltage detected by the open-circuit voltage detector is larger than or equal to the predetermined voltage difference, the telephone status monitoring unit operates to:
   judge that the external telephone releases the public line if the voltage difference between the reference voltage and the detected line voltage detected by the voltage detector when the facsimile circuit has released the public line is smaller than the predetermined voltage difference or if the detected line voltage detected by the voltage detector when the facsimile circuit has released the public line is equal to the open-circuit voltage; and
   judge that the external telephone closes the public line if the voltage difference between the reference voltage and the detected line voltage detected by the voltage detector when the facsimile circuit has released the public line is larger than or equal to the predetermined voltage difference and if the detected line voltage detected by the voltage detector when the facsimile circuit has released the public line is different from the open-circuit voltage.

2. The facsimile device according to claim 1, further comprising:
   a line type judgment unit configured to judge a type of the public line; and
   a detector activation unit configured to activate the open-circuit voltage detector only if the line type judgment unit judges the type of the public line.

3. A facsimile device connected to a public line in parallel with an external telephone, comprising:
   a facsimile circuit configured to send and receive image data through the public line;
   a voltage detector that detects a voltage of the public line;
   an open-circuit voltage detector that releases the public line after closing the public line and detects an open-circuit voltage;
   a telephone status monitoring unit configured to judge whether the external telephone closes the public line or releases the public line based on the voltage of the public line detected by the voltage detector; and
   a warning unit configured to output a warning indicating that the external telephone is in a busy state if the telephone status monitoring unit judges that the external telephone closes the public line,
   wherein if a voltage difference between a reference voltage and the open-circuit voltage detected by the open-circuit voltage detector is smaller than or equal to a predetermined voltage difference at a time when the facsimile circuit has released the public line, the telephone status monitoring unit operates to:
   judge that the external telephone releases the public line if a voltage difference between the reference voltage and a detected line voltage detected by the voltage detector when the facsimile circuit has released the public line is smaller than the predetermined voltage difference; and
   judge that the external telephone closes the public line if the voltage difference between the reference voltage and the detected line voltage detected by the voltage detector when the facsimile circuit has released the public line is larger than or equal to the predetermined voltage difference,
   wherein if the voltage difference between the reference voltage and the open-circuit voltage detected by the open-circuit voltage detector is larger than the predetermined voltage difference, the telephone status monitoring unit operates to:
   judge that the external telephone releases the public line if the voltage difference between the reference voltage and the detected line voltage detected by the voltage detector when the facsimile circuit has released the public line is smaller than the predetermined voltage difference;
   judge that the external telephone closes the public line if the voltage difference between the reference voltage and the detected line voltage detected by the voltage detector when the facsimile circuit has released the public line is larger than or equal to the predetermined voltage difference and if the detected line voltage detected by the voltage detector when the facsimile circuit has released the public line is different from the open-circuit voltage;
   judge that the external telephone releases the public line if the detected line voltage detected by the voltage detector when the facsimile circuit has released the public line is equal to the open-circuit voltage and if a voltage difference between the reference voltage and a voltage of the public line detected by the voltage detector after a predetermined time elapses from a time when the facsimile circuit has released the public line is smaller than the predetermined voltage difference; and
   judge that the external telephone closes the public line if the detected line voltage detected by the voltage detector when the facsimile circuit has released the public line is equal to the open-circuit voltage and if a voltage difference between the reference voltage and a voltage of the public line detected by the voltage detector after a predetermined time elapses from a time when the facsimile circuit has released the public line is larger than or equal to the predetermined voltage difference.

4. The facsimile device according to claim 3, wherein the predetermined time is longer than or equal to a time required for a voltage difference between the reference voltage and a voltage of the public line to change to a value smaller than the predetermined voltage difference with respect to a time when the facsimile circuit releases the public line.

5. The facsimile device according to claim 3, further comprising:
- a line type judgment unit configured to judge a type of the public line; and
- a detector activation unit configured to activate the open-circuit voltage detector only if the line type judgment unit judges the type of the public line.

* * * * *